(12) United States Patent
Nori et al.

(10) Patent No.: US 9,244,241 B2
(45) Date of Patent: Jan. 26, 2016

(54) WATER BORNE ADHESIVE BINDER FOR ADHERING AND ENCAPSULATING POLARIZATION MAINTAINING OPTICAL FIBRE

(75) Inventors: Krishnamurti Nori, Hyderabad (IN); Nayak Jagannath, Hyderabad (IN); Kumar Pradeep, Hyderabad (IN); Ramesh Babu Badri, Hyderabad (IN); MD Azeemuddin, Hyderabad (IN)

(73) Assignee: DIRECTOR GENERAL DEFENCE, RESEARCH & DEVELOPMENT ORGANISATION MINISTRY OF DEFENSE, GOVT. OF INDIA, New Delhi (IN)

( * ) Notice: Subject to any disclaimer, the term of this patent is extended or adjusted under 35 U.S.C. 154(b) by 3 days.

(21) Appl. No.: 14/234,308

(22) PCT Filed: Dec. 9, 2011

(86) PCT No.: PCT/IB2011/002985
§ 371 (c)(1),
(2), (4) Date: Jan. 22, 2014

(87) PCT Pub. No.: WO2013/014492
PCT Pub. Date: Jan. 31, 2013

(65) Prior Publication Data
US 2014/0161409 A1    Jun. 12, 2014

(30) Foreign Application Priority Data
Jul. 25, 2011  (IN) .......................... 2092/DEL/2011

(51) Int. Cl.
*G02B 6/00* (2006.01)
*G02B 6/44* (2006.01)
*C09J 133/10* (2006.01)
*G02B 6/024* (2006.01)

(52) U.S. Cl.
CPC ............. *G02B 6/4439* (2013.01); *C09J 133/10* (2013.01); *G02B 6/4457* (2013.01); *G02B 6/4479* (2013.01); *G02B 6/024* (2013.01)

(58) Field of Classification Search
CPC ............................. G02B 6/4457; C09J 133/10
See application file for complete search history.

(56) References Cited

U.S. PATENT DOCUMENTS

| 5,257,339 A * | 10/1993 | Darsey ...................... F41G 7/32 385/102 |
| 5,532,320 A | 7/1996 | Tripathy |
| 5,981,064 A * | 11/1999 | Burack et al. ................. 428/375 |
| 6,103,375 A | 8/2000 | Birnholz |

OTHER PUBLICATIONS

International Search Report and Written Opinion for corresponding PCT/IB2011/002985, dated May 18, 2012.

* cited by examiner

*Primary Examiner* — Omar R Rojas
(74) *Attorney, Agent, or Firm* — Timothy X. Gibson, Esq.; Gibson & Dernier LLP

(57) ABSTRACT

An optical fiber package comprising an adhesive for coating optical fibers comprising part A and part B wherein Part A is an aqueous polymeric emulsion of 2-ethylhexylacrylate or butyl acrylate and acrylic acid or methacrylic acid and Part-B is polyvinylbutyral dissolved in isopropyl alcohol. The said system imparts stability to the optical fiber on long range exposure thereby improving performance.

7 Claims, No Drawings

WATER BORNE ADHESIVE BINDER FOR ADHERING AND ENCAPSULATING POLARIZATION MAINTAINING OPTICAL FIBRE

FIELD OF INVENTION

This invention relates to an optical fibre package comprising an adhesive binder which imparts improved optical fibre winding, particularly as to their stability on long range exposures and payout properties, and to improve the performance of the packages thus obtained.

BACKGROUND OF THE INVENTION

Optical fiber is a flexible, transparent fiber made-up of very pure glass and associated with the transmission of information as light pulses between the two ends of the fiber. Optical fiber carries much more information than conventional copper wire and in general it is not subjected to electromagnetic interference and signal loss during transmission. Optical fibers have shown great promise in communication and networking applications because it is flexible and can be bundled as cables. It is especially advantageous for long distance communications, because light propagates through the fiber with little attenuation compared to electrical cables. Optical fiber can be very delicate. This creates problems in winding and unwinding operation in optical fiber packages such as canisters.

It is well-known that an adhesive binder is often used to stabilize filamentary structure packages, such as electrical cable and metal wire coil packages. In some specialized applications, the adhesive binder is not only to stabilize the package, but also to control the fluent payout of the filament and also to protect the filament for long life durability. An adhesive binder is usually applied on to the optical fiber or to each fiber layer by layer. The adhesive binder must be compatible with the fiber, which may otherwise cause total damage to the fiber during storage and payout, causing increased optical loss in the fiber or total damage such as crazing due to stress corrosion. The binder must also contribute in solving the problems faced in preparing and using optical fiber canisters. Some such problems are non uniform winding, small gaps, voids, bends and the like.

Several polymeric adhesive binders for optical fiber packages are reported in the prior art, such as Israeli patent 92130; Discloses adhesive composition comprising 5% of an adhesive consisting of one-fourth of 3,3,3-trifluoropropylmethylsiloxane and three-fourths of a polydimethylsiloxane, and 95% of carrier which is a trichlorotrifluoroethane or a trichloroethane or a mixture thereof.

U.S. Pat. No. 6,103,375 discloses adhesive binder composition for optical fiber packages consisting essentially of two parts; "Part A", which is a blend of silicone polymer and epoxy resin, and "Part B", which consist of three components: catalyst for silicone, epoxy curing agent and wetting agent for adhesion improvement. A methacrylic silane wetting agent is added to said components and whole mixture is dissolved in a organic solvent.

U.S. Pat. No. 5,532,320 discloses interpenetrating polymer network which can exhibit non linear optical properties comprising crosslinked polymer network of epoxy based first polymer and phenoxy silicon based second polymer.

Adhesive composition disclosed in above prior art is associated with some serious problems. Prior art adhesive creates difficulties when fiber has to be unwound or paid out from the canister. On many occasions, when the fiber is unwound, the adhesives adhere to the fiber too strongly to cause increased wind resistance or local impacts, when the fiber is deployed. This results in undesirable tension and bending in the fiber. This causes stress concentration and breakages, which means a total failure of the system.

The adhesive binders reported in the prior art contain strong solvents such as trichlorotrifluroethane, or a trichloroethane or their mixtures, and also mixtures of toluene, methylethylketone. All these solvents, as alone or their mixture dissolves the primary and secondary coating of the optical fiber, which results into light loss, and attenuation of the signal.

There is need for an improved adhesive for use in optical fiber winding and payout operations. Such adhesive should have sufficient bond strength and durability to hold the fiber in place during the long term storage without maintenance, flight, and unwinding operation. Also it must not interfere with the fiber unwinding, and hold the fiber layers in place and must allow the fiber to be paid out from the package easily and regularly.

The present invention provides an optical fibre package comprising an adhesive which effectively improves optical fiber winding, particularly as to their stability on long range exposures and payout properties, and improves the performance of the packages thus obtained. Present invention also eliminates the problems associated with prior art optical adhesive binders.

OBJECT OF INVENTION

It is an object of the present invention to provide an optical fibre package comprising an adhesive binder for coating optical fibres, so as to keep the optical fibres in its place.

It is an object of the present invention to provide an optical fibre package comprising an adhesive binder which can be applied either continuously to the optical fiber or to the fiber layers during the winding operation.

It is yet another object of this invention to provide an optical fibre package comprising an adhesive binder that is specifically adapted for the winding and payout of optical fibers on and from canisters for guided objects such as missiles, etc.

SUMMARY OF INVENTION

According to one aspect of the present invention, there is provided an optical fiber package comprising an optical fiber and an adhesive binder system wherein the said adhesive binder system comprises:
  a) Part A which is an emulsion of 2-ethylhexylacrylate or butyl acrylate; and acrylic acid or methacrylic acid;
  b) Part-B which is polyvinylbutyral dissolved in isopropyl alcohol.

According to another aspect of the present invention, there is provided a process for the preparation of an optical fiber package comprising the steps of:
  a. Applying the part A of adhesive binder system on an optical fiber layer by layer,
  b. Winding the optical fiber on a bobbin,
  c. Applying the part B of adhesive binder system on the top layer of the optical fiber of the wounded bobbin,
  wherein the process is carried out at a temperature 60-70° C.

DETAILED DESCRIPTION OF THE PRESENT INVENTION

The present invention provides an optical fiber package which comprises an adhesive binder that is a two part polymer system. One part comprises a water dilutable 2 ethylhexyl acrylate or butyl acrylate and acrylic acid or methacrylic acid copolymer emulsion, and the other part contains polyvinyl butyral with softening point the range of 45 to 85° C., dissolved in a mild solvent, preferably isopropyl alcohol. The advantage of this system is that the part one adhesive binder can be diluted with water to adjust the viscosity of the binder as and when required from time to time.

Since optical fibers used in telecommunication transmission must carry the signal over great distances with the minimum loss, the fibers are normally protected with a coating to protect, and to prevent the outer surface from damage. Even minute scratching will result in light loss, and attenuation of the signal. A typical protective coating system for optical fibers comprises two coats-a primary coat and a top coat. The first coat is soft and flexible with good adhesion and the second coat is harder giving surface slip, resistance to scratching, or mechanical damage, chemical resistance and long term durability. These are generally thermoplastic in nature. So, they are very sensitive to most common solvents except aliphatic straight short chain alcohol such as isopropyl alcohol. The isopropyl alcohol present in the second part of the adhesive binder system of the invention does not dissolve or damage the primary and secondary coatings of the optical fiber.

The adhesive binder of present invention is prepared from the components which consist essentially of two parts; "Part-A" comprises an aqueous emulsion of 2 ethylhexylacrylate or butyl acrylate and acrylic acid or methacrylic acid, co-polymerised by emulsion technique using redox initiator system containing potassium persulphate and sodium metabisulphite. "Part-B" comprises polyvinylbutyral with softening point the range of 45 to 85° C., dissolved in mild solvent such as isopropyl alcohol.

The adhesive binder of present invention is prepared from the components by processes which consist essentially of two parts; "Part A" comprises polymerising 2-ethylhexylacrylate or butyl acrylate with acrylic acid or methacrylic acid, in mild solvent such as water using redox initiator system containing potassium persulphate and sodium metabisulphate. The percent solids of "Part A" are maintained in the range of 50-60 percent, and preferably in the range of 50-54 percent. The glass transition temperature of component should be maintained at least above or below the working temperature, preferably should be below −40° C. or above 85° C. The working temperature is maintained in the range of −40° C. to 85° C.

"Part-B" comprises dissolving polyvinylbutyral in mild solvent such as water or isopropyl alcohol and glass transition temperature is maintained at around 200° C. The percent solids of "Part B" are maintained in the range of 15 to 20 percent.

The viscosity of the adhesive binder should be in range of 5 to 50 cps for appropriate application to optical fiber. The thermal coefficient of linear expansion of adhesive binder should be in same magnitude range of that optical fiber.

The mild solvent used in "Part A" of the preparation process is any mild solvent that do not damage the fiber coats, or aliphatic straight chain alcohols, and preferably isopropyl alcohol or water or their combinations, and for "Part-B" isopropyl alcohol or any other short chain aliphatic alcohols.

Both the parts of adhesive binder "A" and "B" do not contain harmful solvents and are non skin irritants. And pose no damage to optical fibre and health hazards to the operators involved in the optical fibre winding. The acrylic co-polymer present in the "Part-A" and the [poly vinyl butyral present in "Part-B" are responsible for no colour reversion on the fibres on long term exposures.

The invention may be used for winding optical fibers into a package. The component "A" of the adhesive binder, hereinbefore defined has percent solids 50-60, and preferably 50-54 percent. During winding an effective amount of the said part A by a method chosen from among passing the fiber through said solution, or brushing or spraying the said solution on each layer till winding is completed. The second part B which comprises of Poly vinyl butyral as 15-20 percent solution in isopropyl alcohol is then applied as top coat to protect the part A adhesive binder coating. The polymer deposits on the fibers uniformly after the evaporation of the water from the part A by applying external heat to the fiber either by using hot air blower, or by passing the coated fiber through a hot air tunnel before it is wound on to the spool (bobbin), or by placing the infra red lamps near the spool during the winding operation; and isopropyl alcohol from part B is also removed in the same manner.

After applying the adhesive binder to the optical fiber, the optical fiber can be unwound, whenever it is necessary to eliminate any winding defects during the winding operation, and again the winding operation may be continued without damaging the surface of the optical fiber and without any voids and bends to the optical fiber. Also the adhesive binder has sufficient bond strength to hold the fiber in place during the long term storage and unwinding operation. The binder also allows the fiber to paid out from the package easily and regularly.

After completion of winding process, the optical fiber wound spools were subjected to thermal cycling tests. The tests were conducted by placing spools for one hour soaking at each of the temperatures at 25° C., 65° C., 85° C., −20° C., −40° C. and 25° C. The temperature rising and cooling gradient of 5° C. per minute was maintained. The Polarization Extinction Ratios (PER) were determined. PER values are mentioned in table-1. The difference in PER values at 85° C. and −40° C. is in the range of 1-2 dB only. The spools were then subjected to accelerated weathering at temperatures 85° C. and at 85% humidity over a period of 30 days. The PER values were then re-determined on each spool at temperatures 25° C., 65° C., 85° C., −20° C., −40° C. and 25° C. No deterioration in the PER values was noticed. The optical fiber winding showed practically no colour reversion on the fibers on long term exposures.

In a 5 liter flask deionised water (900 ml), anionic surfactant (40 g), Non-ionic surfactant (20 g) sodium bicarbonate (5 g) and ethylcellosolve acetate (25 g) were taken and heated to 75° C. under stirring at 70 r.p.m. Now potassium persulphite (2% aqueous solution) (20 g), and sodium meta bisulphate (2% aqueous solution) (25 g) were added. A monomer mixture of 2-ethylhexyl acrylate (970 g) and acrylic acid (30 g) were added gradually over a period of 4 hours. Emulsion polymerization takes place. At the end of 4 h temperature was increased to 80° C. for 30 min. to complete polymerization. Then cooled the product to 30 C and then discharged. This is the Part "A" adhesive binder. The Part B adhesive binder was prepared by dissolving Polyvinyl butyral powder (20 g) in 100 g water at 75-80° C. under stirring. When clear solution was obtained, it was filtered and then cooled.

TABLE 1

Polarization Extinction Ratio (PER) before and after accelerated weathering exposures (dB)

| Bobbin | | 25° C. | 65° C. | 85° C. | −20° C. | −40° C. | 25° C. |
|---|---|---|---|---|---|---|---|
| 1 | Before | 22.50 | 21.80 | 20.94 | 21.68 | 22.15 | 23.00 |
|   | After  | 21.40 | 21.60 | 21.22 | 21.90 | 22.00 | 22.90 |
| 2 | Before | 23.80 | 23.20 | 21.80 | 21.60 | 20.20 | 23.90 |
|   | After  | 22.80 | 22.20 | 22.00 | 21.80 | 20.20 | 22.89 |

TABLE 1-continued

Polarization Extinction Ratio (PER) before and after accelerated weathering exposures (dB)

| Bobbin | | 25° C. | 65° C. | 85° C. | −20° C. | −40° C. | 25° C. |
|---|---|---|---|---|---|---|---|
| 3 | Before | 24.60 | 24.20 | 20.20 | 21.40 | 19.00 | 25.80 |
|   | After  | 22.70 | 23.33 | 21.90 | 21.00 | 20.20 | 24.00 |
| 4 | Before | 23.60 | 22.10 | 20.80 | 21.00 | 19.30 | 23.40 |
|   | After  | 23.40 | 22.30 | 20.30 | 20.90 | 19.99 | 22.60 |
| 5 | Before | 23.20 | 22.60 | 19.90 | 22.80 | 20.60 | 23.32 |
|   | After  | 23.00 | 22.10 | 20.00 | 21.77 | 19.80 | 22.50 |
| 6 | Before | 22.46 | 22.66 | 20.25 | 23.09 | 19.48 | 23.20 |
|   | After  | 22.10 | 21.60 | 20.55 | 22.90 | 20.00 | 23.80 |
| 7 | Before | 23.96 | 21.78 | 19.85 | 22.01 | 21.60 | 22.46 |
|   | After  | 22.80 | 21.77 | 20.20 | 23.00 | 21.50 | 22.90 |
| 8 | Before | 25.00 | 21.27 | 20.17 | 21.56 | 20.90 | 22.54 |
|   | After  | 24.20 | 20.90 | 21.40 | 20.80 | 20.80 | 23.60 |
| 9 | Before | 25.90 | 25.50 | 21.10 | 21.60 | 20.10 | 26.30 |
|   | After  | 24.80 | 24.60 | 21.90 | 20.90 | 20.30 | 24.70 |
| 10 | Before | 24.40 | 23.60 | 20.20 | 20.80 | 19.70 | 24.50 |
|    | After  | 23.30 | 23.50 | 21.40 | 21.50 | 19.70 | 23.00 |
| 11 | Before | 26.50 | 23.70 | 21.30 | 23.10 | 20.00 | 25.90 |
|    | After  | 26.00 | 22.70 | 21.10 | 22.70 | 20.70 | 25.60 |
| 12 | Before | 25.40 | 23.80 | 21.40 | 22.90 | 20.30 | 25.20 |
|    | After  | 24.90 | 22.90 | 21.40 | 22.10 | 19.80 | 24.00 |

ADVANTAGES OF THE INVENTION

The optical fibres used were manufactured by Corning, or Nufern or any other standard firms The adhesive binder of the invention can be applied in regular or continuous winding process. In regular winding, the adhesive binder is applied to each layer after it is wound either by brush or spray and then the adhesive binder coating is dried continuously while exposing the bobbin to infra red lights placed closely to the bobbin. In continuous winding, the adhesive binder is applied directly by leading the fiber through a bath containing the adhesive binder and then passed through a hot air tunnel at 60-70 C to evaporate the water present in the Part A before it is wound on to the bobbin. The adhesive binder part B is applied as the top coat finally to protect the part A adhesive binder coating and the solvent isopropyl alcohol is removed in the same manner by exposing the bobbin to infra red radiation.

Both the adhesive binders "A" and "B" do not contain harmful solvents to the optical fiber and as well to the operator who does the winding of the optical fiber. These solvents do not pose any fire hazards too, as in the case of solvents, such as toluene and methyl ethyl ketone; and their mixtures, used by earlier investigators.

Post cure operation of the adhesive binders is not necessary thereby saving time, and facilitating faster production, reduction of cost due to the elimination of the curing apparatus. The glass transition temperatures of the adhesive binders part A and B are maintained well below or well above the operating temperatures 85° C. to −40° C.

Yet another major advantage of this invention is that the optical fiber can be unwound, whenever it is necessary to eliminate any winding defects during the winding operation, and again the winding operation may be continued without damaging the surface of the optical fiber and without any voids and bends to the optical fiber.

Another important advantage of the present adhesive binder system of this invention is that it contains water and isopropyl alcohol as diluents and both these do not damage the primary and secondary coatings of the optical fiber.

Yet another important advantage of the present adhesive binder system of this invention is that it gives absolutely water white transparent, and glossy coating on the optical fibers.

The following examples are meant to illustrate the present invention. The examples are presented to exemplify the invention and are not to be considered as limiting the scope of the invention.

EXAMPLES

Example 1

In a 5 liter flask deionised water (900 ml), anionic surfactant (40 g), Non-ionic surfactant (20 g) sodium bicarbonate (5 g) and ethylcellosolve acetate (25 g) were taken and heated to 75 C under stirring at 70 r.p.m. Now potassium persulphite (2% aqueous solution) (20 g), and sodium meta bisulphate (2% aqueous solution) (25 g) were added. A monomer mixture of 2-ethylhexyl acrylate (970 g) and acrylic acid (30 g) were added gradually over a period of 4 hours. Emulsion polymerization takes place. At the end of 4 h temperature was increased to 80° C. for 30 min. to complete polymerization. Then cooled the product to 30 C and then discharged. This is the Part "A" adhesive binder. The Part B adhesive binder was prepared by dissolving Polyvinyl butyral powder (20 g) in 100 g water at 75-80° C. under stirring. When clear solution was obtained, it was filtered and then cooled.

Two bobbins (1 and 2) were then wound using, Part A adhesive binder, with Nufern optical fiber of length 1100 meters using Quadrupolar winding machine. The top two layers of optical fiber was then wound using adhesive binder "B". Throughout the winding operation the adhesive was applied using a brush on the optical fiber layer by layer, and drying was effected by placing infra red lights close to the bobbin. PER were determined at 25° C., 65° C. 85° C., −20° C., −40° C., and 25° C. after soaking for one hour at each temperature. The PER values are reported in Table-1. The bobbins were then tested at 85° C. and at humidity 85% for 30 days and PER values were again determined to see for any deterioration. No deterioration was observed.

Example 2

The emulsion polymerization process adopted here was exactly same as mentioned in example-1, but instead of acrylic acid methacrylic acid (20 g) was used. The adhesive binder "B" was prepared by dissolving polyvinylbutyral (15 g) in water (100 g). Two bobbins (3 and 4) were wound in similar manner, and tested also in the similar manner as in example-1. The PER values are reported in Table-1

Example 3

Adhesive binder "A" was prepared in the same manner as reported in example-1, but instead of 2-ethylhexyl acrylate, butyl acrylate (970 g) was used. The adhesive binder B was same as mentioned in example-1. Two bobbins (5 and 6) were wound and tested in similar manner as given in example-1. The PER values are given in Table-1

Example 4

Adhesive binder (Part-"A") was prepared by solution polymerization in a 5 liter flask using 2-ethylhexyl acrylate (970 g), acrylic acid (30 g), benzoyl peroxide (5 g) and solvent ethyl acetate (2000 ml) at the reflux temperature for 4 h. The viscosity of the solution increased as the polymerization proceeded. Then the solvent was totally distilled off and the final traces were removed under low pressure. The viscous polymer was then taken in deionised water (1000 g) and stirred vigorously in presence of anionic surfactant (40 g). The adhesive binder "B" used was same as the one mentioned in example-1.

Two bobbins (7 and 8) were wound and tested as per the example-1. The PER values are given in Table-1

Example 5

Adhesive binder (Part-A) was prepared in the same manner as mentioned in example-4, instead of acrylic acid, methacrylic acid (20 g) was used. The adhesive binder part-B used was the same as given in example-1. Two bobbins (9 and 10) were wound with optical fiber (Nufern make) 140 meters length. In this case the optical fiber was passed through bath of adhesive binder A continuously and then passed through a hot air tunnel to remove the water in the adhesive binder and then wound to the bobbin. After the competition of winding the adhesive binder "B" was applied to the optical fiber with brush and after that the solvent was dried by using hot air blower. The bobbins were then tested in the same manner as explained in example-1. The PER values are reported in Tables-1.

Example 6

Adhesive binder (Part-"A") was prepared in the same manner as described in example-4, but instead of 2-ethylhexyl acrylate, butyl acrylate was used. All other parameters and conditions employed, remained same as given in the example-5. Two bobbins (11 and 12) were wound using 140 meters of Nufern optical fiber and then tested as reported in the example-5. The PER values are reported in Tables-1

In present invention, for "Part A" many other combinations of components were tried, which have not performed satisfactorily. Following are the examples of those compositions.

Composition A

Polymerizing 2-ethylhexylacrylate and ethyl acrylate with acrylic acid or methyl methacrylate, and glass transition temperature (Tg) of the components is around −20° C.

Composition B

Polymerizing ethyl acrylate and methyl acrylate with acrylic acid or methyl methacrylate and glass transition temperature (Tg) of the components is around −10° C.

Composition C

Polymerizing 2-ethylhexylacrylate and methyl acrylate with acrylic acid or methyl acrylate, and glass transition temperature (Tg) of the components is around +10° C.

The Bobbins were wound using above compositions and tested in similar manner as given in example 1 to 6. The PER values are reported in Table-2. For satisfactory performance PER values should be at least +19 dB and above over the temperature range.

TABLE 2

| | PER of failed compositions | | | | | |
|---|---|---|---|---|---|---|
| | 25° C. | 65° C. | 85° C. | −20° C. | −40° C. | 25° C. |
| A | 25.78 | 24.44 | 21.14 | 17.79 | 13.25 | 25.38 |
| B | 23.63 | 23.31 | 19.15 | 15.56 | 10.27 | 23.08 |
| C | 13.07 | 9.94 | 8.10 | 9.81 | 6.87 | 15.45 |

The invention claimed is:

1. An optical fiber package comprising an optical fiber and an adhesive binder system wherein the said adhesive binder system comprises:
   a) Part A which is an emulsion of 2-ethylhexylacrylate or butyl acrylate; and acrylic acid or methacrylic acid;
   b) Part-B which is polyvinylbutyral dissolved in isopropyl alcohol; and
      wherein said adhesive binder system is applied to said optical fiber in a regular or continuous winding process.

2. The optical fiber package as claimed in claim 1 wherein the part A of adhesive binder system comprises 50 to 54% w/w of polymer.

3. The optical fiber package as claimed in claim 2 wherein the part A of adhesive binder system is prepared by emulsion polymerization in water medium at 50-80° C. in the presence of redox initiators, potassium persulphate and sodium metabisulphite.

4. The optical fiber package as claimed in claim 1 wherein the part B of adhesive binder system comprises 15 to 20% w/w of polyvinylbutyral.

5. The optical fiber package as claimed in claim 4 wherein polyvinylbutyral has softening point in the range of 45 to 85° C.

6. The optical fiber package as claimed in claim 5 wherein the part B of adhesive binder system is prepared by dissolving Polyvinyl butyral powder in isopropyl alcohol at 70-85° C.

7. The optical fiber package as claimed in claim 1 wherein the change in polarization extinction ratio of the optical fiber package remains between 1-2 dB at the operating temperature range from −40° C. to +85° C., when tested after prior exposing the optical fiber package to accelerated weathering at 85 C, and at relative humidity of 85 percent for 30 days.

* * * * *